United States Patent [19]

Takahama et al.

[11] 4,134,465

[45] Jan. 16, 1979

[54] APPARATUS FOR MEASURING WEIGHT OF BULK MATERIAL CONVEYED BY BELT CONVEYOR

[75] Inventors: Hisataka Takahama, Amagasaki; Hitoshi Kimura, Kashiwara, both of Japan

[73] Assignee: Kubota, Ltd., Osaka, Japan

[21] Appl. No.: 641,166

[22] Filed: Dec. 16, 1975

[30] Foreign Application Priority Data

Dec. 20, 1974 [JP] Japan ..................................... 50-2711

[51] Int. Cl.$^2$ .......................................... G01G 11/14
[52] U.S. Cl. ..................................... 177/16; 198/504; 235/92 WT; 364/567
[58] Field of Search ........................... 177/16, 15, 18; 117/119, DIG. 3; 235/92 WT, 151.33; 364/567; 198/504, 505

[56] References Cited

U.S. PATENT DOCUMENTS

| | | | |
|---|---|---|---|
| 3,559,451 | 2/1971 | Hyer | 177/16 X |
| 3,578,955 | 5/1971 | Kloven | 235/92 WT |
| 3,610,908 | 10/1971 | Karosas | 177/16 X |
| 3,714,401 | 1/1973 | Yano | 235/151.33 |
| 3,724,720 | 4/1973 | Bullivant | 198/505 |
| 3,754,126 | 8/1973 | Williams | 235/151.33 |
| 3,979,055 | 9/1976 | Fathauer | 235/92 WT |
| 3,985,266 | 10/1976 | Wright | 177/16 X |

Primary Examiner—Joseph W. Hartary

Attorney, Agent, or Firm—Birch, Stewart, Kolasch and Birch

[57] ABSTRACT

An apparatus for cumulatively measuring the weight of a continuous bulk material conveyed by a belt conveyer, comprising; a pulse generator operatively coupled to the conveyer for generating pulses of the frequency associated with the conveyer speed; a decimal counter for counting the speed associated pulses; a full scale detector coupled to the decimal counter; a load cell operatively coupled to the conveyer for providing an analog signal representative of the weight of the material within a predetermined span of the conveyor; an analog-to-digital converter responsive to the full scale output for converting the analog signal into a bit parallel coded digital signal; logical processing means for modifying the number of pulses obtainable from the decimal counter within one full scale of the counter as a function of the bit parallel coded digital signal and a cumulative counter for counting the pulses thus modified of the pulse number. Preferably, the decimal counter, the logical processing means and the analog-to-digital converter each comprises the most significant digit portion and the less significant digit portions, and the outputs from the most and less significant digit portions of the decimal counter are separately withdrawn for processing to be applied to the cumulative counter, whereby high precision of measurement is attained with a simplified structure.

20 Claims, 10 Drawing Figures

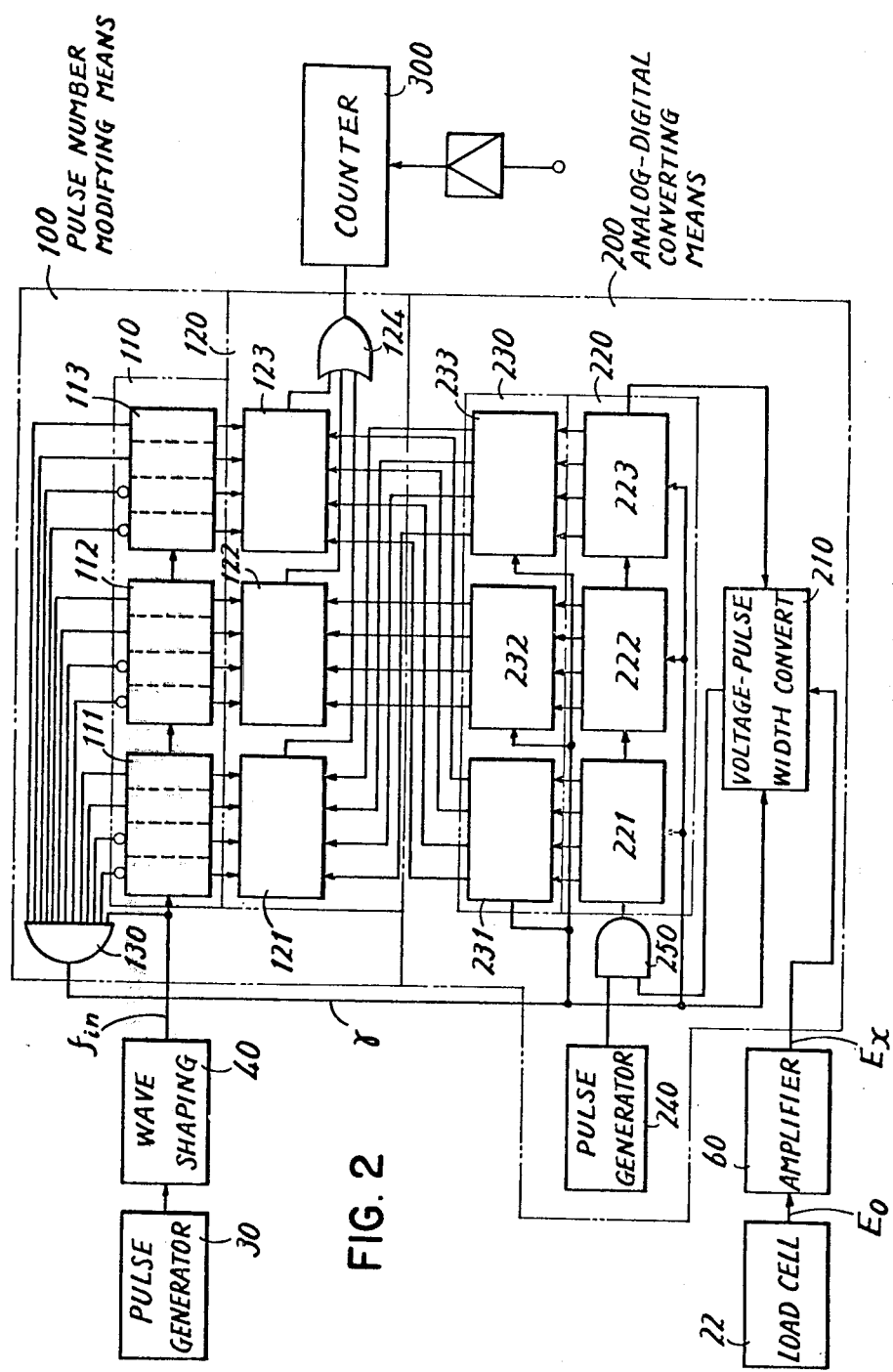

APPARATUS FOR MEASURING WEIGHT OF BULK MATERIAL CONVEYED BY BELT CONVEYOR

BACKGROUND OF THE INVENTION

1. Field of the Invention

The present invention relates to an apparatus for measuring the weight of a bulk material conveyed by a conveyor. More specifically, the present invention relates to an improved apparatus for accumulating in an electronic manner the weight of a bulk material continuously conveyed by a conveyor.

2. Description of the Prior Art

A belt conveyor has been widely used for transporting a bulk material, such as a powder like material, grain like material, or the like. In transporting such a material, it is desired to measure the weight of the material placed on the conveyor, while it is conveyed. It is well known that the weight of a bulk material to be conveyed continuously by a conveyor is associated with the product of an instantaneous value of the weight at a given measuring point of the conveyer and the conveying speed of the conveyor. A certain type of an apparatus for measuring the weight of a bulk material placed on and conveyed by a conveyer employing such a principle has been proposed and has been in practical use. Such a conventional measuring apparatus comprises means for generating pulses the frequency of which is associated with the conveying speed of a conveyer belt and a load cell for generating an analog voltage signal associated with the value of a bulk material placed on and conveyed by the conveyer belt at a given measuring point. The analog voltage signal is converted by means of an analog-to-digital (A/D) converter into a bit serial digital signal or pulse signal as a function of the said conveyor speed associated pulse signal. More specifically, the said conveyor speed associated pulse signal is counted by a counter to provide an output at every predetermined number of the conveyer speed associated pulses. An integrator included in the said A/D converter is enabled by the said output from the counter to integrate the analog value whereupon the said stored value is caused to be discharged at a predetermined time constant, the time period of the discharging being representative of the analog value. A pulse representative of the discharging time period is obtained to allow a train of clock pulses obtained from a separate clock source to pass through such that the number of passing clock pulses may be associated with the discharging time period and thus the analog value. The train of the clock pulses thus allowed to pass through is withdrawn by way of the said bit serial digital signal or pulse signal. As the weight of the material increases, the number of bit serial pulse signals obtainable at every said predetermined number of conveyer speed associated pulses increases. Since the said bit serial digital signal is obtained concentratively at intervals of every predetermined number of conveyer speed associated pulses, it is necessary that the frequency of the digital signals and thus the clock pulses from the clock source should be rather high. Accordingly, a counter for cumulatively counting the number of the bit serial digital signal pulses need be of a high speed counter. In general, however, a high speed counter is susceptible to a noise and thus is liable to give rise to an error of measurement. Since the above described conventional apparatus does not hold an instantaneous value of the measured weight at each A/D conversion, such apparatus is not suited for measurement of an instantaneous value of the weight and thus for provision of a quantitative output of an instantaneous weight value.

SUMMARY OF THE INVENTION

In accordance with the present invention, means is provided for generating an analog signal representative of the weight of a continuous bulk material conveyed by conveying means and an output from the said analog signal generating means is converted into a bit parallel coded digital signal. On the other hand a pulse generator is operatively coupled to the said belt conveyor, such that a train of pulses of the frequency associated with the conveying speed of the said conveying means is generated and a predetermined number of the speed associated pulses are counted to provide a signal indicative of said predetermined number of pulses. Pulse number modifying means is provided, to be responsive to the said predetermined pulse number indicating signal, said speed associated pulses, and said bit parallel coded digital signal, for modifying the number of speed associated pulses within said predetermined number of pulses as a function of said bit parallel coded digital signal. The pulses thus modified of the pulse number are cumulatively counted to display the cumulative weight of the material conveyed by the said conveying means. Preferably, the said bit parallel coded digital output obtainable from the A/D converting means is latched by latching means responsive to the said predetermined number indicating signal.

In a preferred embodiment of the present invention, the said pulse number modifying means comprises more significant digit modifying means for modifying the number of pulses within said predetermined number of pulses, with respect to the more significant digit, and less significant digit modifying means for modifying the number of pulses within said predetermined number of pulses, with respect to the less significant digit. The output from the said more significant digit modifying means may be weighed in respect of the said more significant digit, if desired, but may not be weighed at all, if desired. The value in the said more significant digit may be a binary value of 1 or 0, and in such an embodiment, the said more significant digit modifying means comprises means for frequency dividing the pulses from said pulse generating means by two, and gate means for allowing the frequency divided output to pass therethrough as a function of an output of the corresponding digit position of the said A/D converting means. An output from the more significant digit modifying means and an output from the less significant digit modifying means are OR processed and are applied to an accumulative counter, for example, in the embodiment wherein the output from the more significant digit modifying means is not weighed at all. In case of the embodiment wherein an output from the more significant digit modifying means is weighed in respect to the said digit, such an output is directly applied to a more significant digit portion of a cumulative counter.

Preferably, the said A/D converting means comprises means for converting, in a rough manner, the said analog signal into a digital signal, and means for converting, in a fine manner, the said analog signal into a digital signal. An output from the said rough A/D converting means is applied to the said more significant digit modifying means, and an output from the said fine A/D converting means is applied to the said less significant digit modifying means.

More preferably, the said A/D converting means comprises means for judging direction in change of the said analog signal, and the said output withdrawing means comprises a reversible counter, which is controlled by an output from said change direction judging means.

Therefore, a principal object of the present invention is to provide an improved apparatus for measuring a continuous bulk material conveyed by a conveying means, wherein a train of pulses is generated in association with the speed of said conveying means, while the weight of the material is measured by way of an analog signal and the number of the said speed associated pulses is modified continuously as a function of the said analog signal.

Another object of the present invention is to facilitate measurement of an instantaneous value of the weight in an apparatus for measuring the weight of a continuous bulk material conveyed by a conveying means.

A further object of the present invention is to enhance measurement precision, by a simplified structure, in an apparatus for measuring the weight of continuous bulk materials conveyed by a conveying means.

Still another object of the present invention is to provide an improved apparatus for measuring the weight of a continuous bulk material conveyed by a conveying means, wherein reliability and immunity from environmental influence are enhanced with a simplified structure.

These objects and other objects, aspects, features and advantages of the present invention will be better understood by the following detailed description when taken with reference to the accompanying drawings.

BRIEF DESCRIPTION OF THE DRAWINGS

FIG. 2 illustrates a block diagram of the circuit configuration of an embodiment of the inventive weight measuring apparatus.

DESCRIPTION OF THE PREFERRED EMBODIMENT

Figure 1:
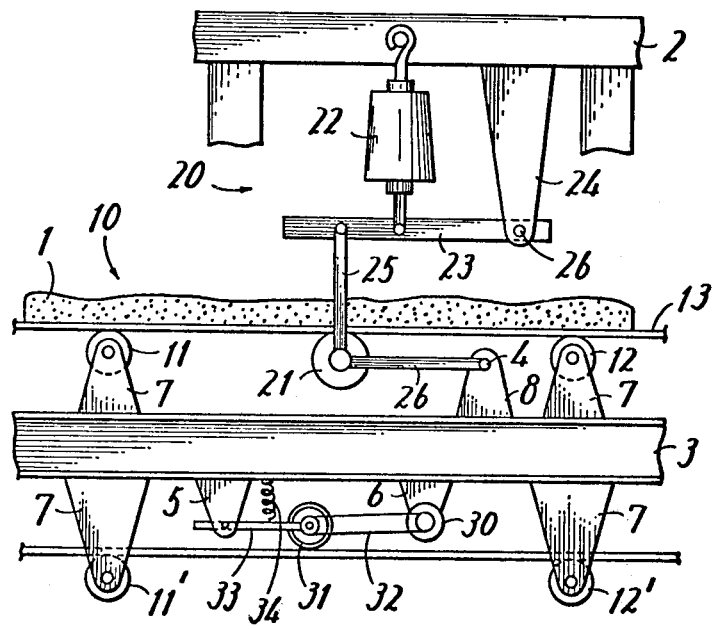
FIG. 1 is an illustration of the structure of an apparatus for measuring the weight of a continuous bulk material placed on and conveyed by a belt conveyor in accordance with the present invention.

FIG. 1 is an illustration of the structure of an apparatus for measuring the weight of a continuous bulk material placed on and conveyed by a belt conveyor in accordance with the present invention. The inventive measuring apparatus shown comprises a belt conveyor 10, a device 20 for generating an analog signal representative of the weight of a continuous bulk material 1 placed on and conveyed by the conveyor 10, and a device 30, such as a pulse generator, for generating a chain of pulses such that the frequency thereof is associated with the speed of the belt conveyor 10. The belt conveyor 10 comprises a conveyor belt 13 for transporting the material 1 placed thereon. The conveyer belt 13 is adapted to circulate along an elongated elliptical form, as well known. The conveyer belt 13 is movably supported by means of upper rollers 11 and 12 and lower rollers 11' and 12', pivotally mounted on supporting legs 7 protrudingly provided in place on a frame 3. The conveyer belt 13 is caused to circulate by means of a prime mover (not shown), as well known.

The analog signal generator 20 is provided intermediate the rollers 11 and 12. The generator 20 comprises a measuring roller 21 positioned at an approximate middle position of the rollers 11 and 12 which is pivotally mounted at the end of the rocking bar 26 pivotally mounted to a leg 8 of the frame 3. The measuring roller 21 is coupled by a link 25 to a free end of a lever 23, the opposite end of which is rotatably supported at a supporting point 26 by a supporting leg 24 of a frame 2 externally provided of the closed conveyer belt 13. The load cell 22 is provided between the frame 2 and the lever 23 to hang the lever 23 upward, such that the lever 23 is urged upward and thus the measuring roller 21 is also urged upward in close contact with the lower surface of the conveyer belt 13. When the material 1 is placed on the conveyor belt 13, the intermediate portion of the conveyor belt 13 between the rollers 11 and 12 comes down due to the weight of the material 1 to depress the measuring roller 21 downward. The downward force exerted on the roller 21 is transferred by the link 25 and the lever 23 to the load cell 22. As a result, an instantaneous value of the weight of the material 1 around the intermediate portion between the rollers 11 and 12 is detected by the load cell 22 and is withdrawn by way of an analog signal representative of the weight of the material 1 to be conveyed by the conveyer belt 13. Thus, an analog voltage signal representative of the weight of the materials placed distributed throughout a given length of the conveyer belt 13 is provided.

The pulse generator 30 is provided at a leg 6 of the frame 3. The generator 30 is coupled to a speed detecting roller 31 by means of a timing belt 32. The speed detecting roller 31 is rotatably provided at the free end of a link 33, the opposite end of which is pivotally supported by a supporting leg 5 of the frame 3. The link 33 is urged downward by means of a spring 34, so that the roller 31 is urged in close contact with the surface of the conveyer belt 13. As a result, the movement of the conveyer 13 causes the roller 31 to rotate, and thus to rotate the timing belt 32, whereby the movement of the conveyer belt 13 is transferred to the pulse generator 30. The pulse generator 30 is adapted to generate a pulse for a predetermined rotation of the speed detecting roller 31 and thus for a predetermined movement of the conveyer belt 13. In other words, the pulse generator 30 generates one pulse during the movement of a predetermined distance of the conveyer belt 13. The pulse thus obtained from the pulse generator 30 as well as the analog signal obtained from the load cell 22 is utilized for measurement of the weight of the material placed on and conveyed by the conveyer belt, as to be more fully described subsequently with reference to FIG. 2.

Figure 2A:
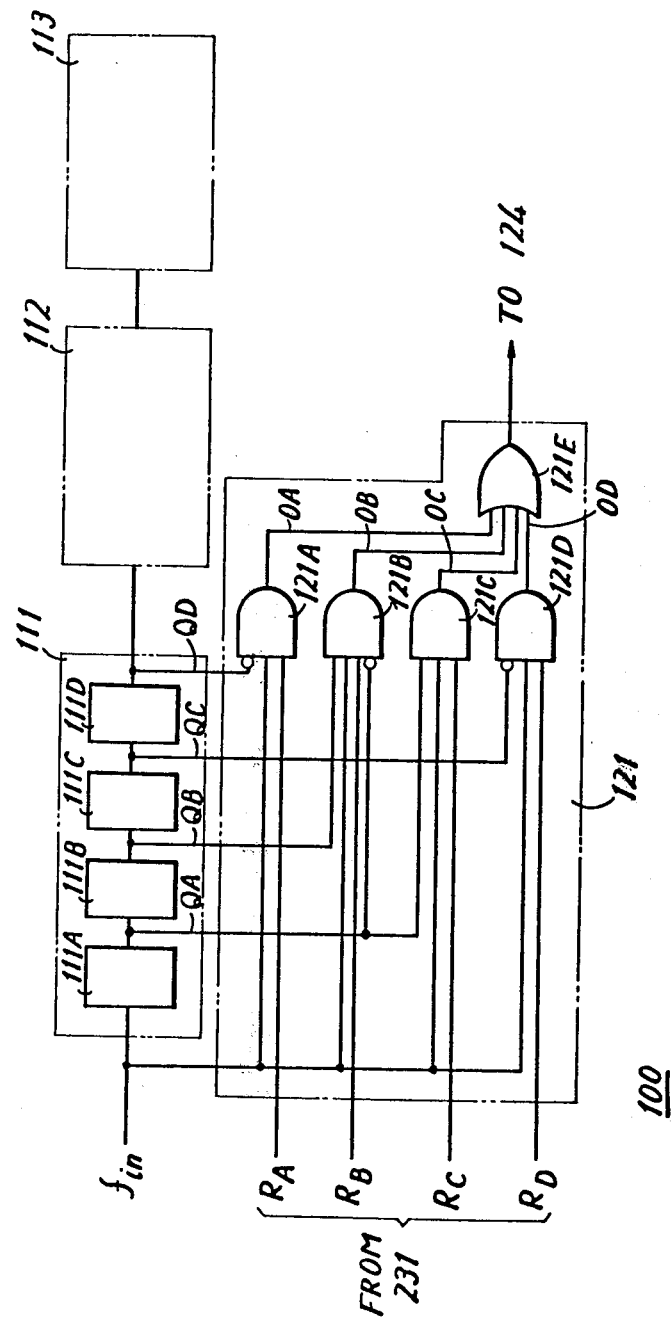
FIG. 2A is a block diagram showing in more detail the circuit configuration of the pulse number modifying means 100 of FIG. 2.

FIG. 2 illustrates a block diagram of the circuit configuration of an embodiment of the inventive weight measuring apparatus. The FIG. 2 embodiment is shown comprising an A/D converting means 200 coupled to the load cell 22 (the signal generator 20 for generating an analog signal representative of the weight of the material) and pulse number modifying means 100 coupled to the pulse generator 30 and the A/D converting means 200. The pulses obtainable from the pulse generator 30 shown in FIG. 1 are wave shaped by means of a wave shaping circuit 40, and the pulses thus wave shaped are fed to the pulse number modifying means 100 as at $f_{in}$. The pulse number modifying means 100 comprises three-digit decimal counter 110 comprising digit decimal counters 111, 112 and 113, a conditioning circuit 120 and a full scale detector 130. Each of the digit decimal counters 111, 112 and 113 constituting the decimal counter 110 comprises four bit positions. The pulses $f_{in}$ the frequency of which is associated with the speed of the conveyer belt 13 are counted by means of the decimal counter 110. The outputs from the decimal counter 110 at its respective bit positions are individually fed to the corresponding inputs of the conditioning circuit 120. The conditioning circuit 120 receives the bit parallel coded digital output from the A/D converting means 200 to modify the pulse outputs obtainable from the decimal counter 110 so as to reduce the number of pulses per a predetermined number of speed associated pulses as a function of the bit parallel coded digital signal from the A/D converting means 200. In other words, the conditioning circuit 120 serves to pulse modulate the output pulses obtainable from the decimal counter 110 as a function of the bit parallel coded digital output from the A/D converting means 200 through logical processing. To that end, the conditioning circuit 120 comprises three digit logical processing circuits 121, 122 and 123, corresponding to the respective digit counters 111, 112 and 113 of the decimal counter 110, and an OR gate 124. The decimal counter 110 and the conditioning circuit 120 will be described in more detail subsequently with reference to FIG. 2A. The pulse output from the conditioning circuit 120 is cumulatively counted by a cumulative counter 300, which typically comprises eight digits.

The pulse output obtainable at twelve bit positions of the decimal counter 110 are applied to the full scale detector implemented by an AND gate 130. The full scale detector 130 functions to provide a full scale detected signal only if and when every digit counter 111, 112 and 113 becomes in a full scale condition, i.e. becomes to assume the decimal number "9." The input pulse $f_{in}$ is also applied to one input to the AND gate 130 in order to strobe the output obtainable from the AND gate 130. Since in the embodiment shown the logic convention was employed wherein the decimal number "9" is represented by a binary coded value "1100", the outputs at the least significant bit position and the bit position next thereto are applied, after inverted, to the AND gate 130 for each digit counter 111, 112 or 113. Since the counter 110 comprises a three-digit decimal counter, it is capable of counting the pulses of up to "999" of the decimal number. Thus, it is understood that the full scale detector 130 provides one pulse output $\gamma$ at every 1000 pulses $f_{in}$ provided by the pulse generator 30.

The analog signal obtainable from the load cell 22 is amplified by an amplifier 60 and is applied to the A/D converting means 200 where the analog signal is converted into a bit parallel coded digital signal, as briefly described previously. The converting means 200 comprises a voltage-pulse width converter 210, a three-digit decimal counter 220, a three-digit latch circuit 230, a clock pulse generator 240 for generating clock pulses of a predetermined fixed frequency, and an AND gate 250. The analog signal as simplified is applied to the voltage-pulse width converter 210, which is enabled by the output $\gamma$ from the full scale detector 130 to generate a pulse having the pulse width proportional to the magnitude of the analog signal. The output pulse of such pulse width is applied to one input to the AND gate 250. The other input to the AND gate 250 is connected to receive the clock pulses from the pulse generator 240, which generates clock pulses of a predetermined fixed frequency, as described previously. As a result, the AND gate 250 allows the clock pulses to pass therethrough, the number of which is determined as a function of the width of the pulse from the converter 210 and thus is proportional to the instantaneous value of the weight of the material when the enabling signal $\gamma$ is obtainable from the full scale detector 130. A train of clock pulses passing through the AND gate 250 is applied to the decimal counter 220 and is counted thereby. The decimal counter 220 comprises three digit counters 221, 222 and 223, each comprising four bit positions. A carry signal, or a count up signal obtainable from the most significant bit position of the most significant digit counter 223 is applied to the converter 210 for the purpose of resetting it. The data as stored in the decimal counter 220 is applied in a bit parallel fashion to the latch circuit 230, which is enabled by the output signal $\gamma$ from the full scale detector 130, thereby to hold the data transferred from the decimal counter 220 to the latch circuit 230. To that end, the latch circuit 230 also comprises three digit latch circuits 231, 232 and 233, such that each digit latch circuit 231, 232 and 233 corresponds to each digit counter 221, 222 or 223 of the decimal counter 220. Accordingly, during the time period when 1000 pulses of the frequency associated with the speed of the conveyer belt are provided by the pulse generator 30, the bit parallel coded digital data generated in the decimal counter 220 is transferred to the latch circuit 230 and is kept held in the latch circuit 230. The decimal counter 220 is also reset by the pulse output $\gamma$ from the full scale detector 130. The output from the latch circuit 230 is applied, in a bit parallel fashion, to the conditioning circuit 120 of the pulse number modifying means 100, as described previously. The A/D converting means 200 will be described in more detail subsequently with reference to FIG. 2B.

FIG. 2A is a block diagram showing in more detail the circuit configuration of the pulse number modifying means 100 of FIG. 2. The FIG. 3A shows waveforms of the signals at various portions in the FIG. 2A circuit, and will be referred to in the following description of the FIG. 2A circuit. In FIG. 2A only a portion corresponding to the least significant digit counter 111 of the decimal counter 110 and corresponding to the least significant digit conditioning circuit 121 of the conditioning circuit 120 is shown in more detail, while the remaining portions are shown in the same simplified manner as that of FIG. 2. With particular reference to the least significant digit counter 111 in FIG. 2A, the decimal counter 111 is shown in such a simplified manner as comprising only four flip-flops 111A, 111B, 111C and 111D. A more detailed circuit configuration of such a decimal counter is well known to those skilled in the art. Each time one input pulse $f_{in}$ (see (1) of FIG. 3A) is applied to the least significant bit flip-flop 111A, a single pulse is obtained at any one output QA, QB, QC, or QD of the decimal counter 111, as shown at (2) to (5) of FIG. 3A, these outputs QA, QB, QC and QD being withdrawn in a bit parallel fashion. The bit parallel outputs QA, QB, QC and QD as well as the input pulse $f_{in}$ are applied to the logical processing circuit 121 for the purpose of logical processing, as to be more fully described subsequently. The logical processing circuit 121 comprises four AND gates 121A, 121B, 121C and 121D, and an OR gate 121E. It is pointed out that the input pulse $f_{in}$ is applied as one input to the respective AND gates 121A, 121B, 121C and 121D for the purpose of strobing. The bit output QA from the first stage (the least significant bit) cell 111A is applied to the AND gate 121C and is also applied, after inverted, to the AND gate 121B. The bit output QB from the second stage (the second least significant bit) cell 111B is applied to the AND gate 111B. The bit output QC from the third stage (the third least significant bit) cell 111C is applied, after inverted, to the AND gate 121D. The bit output QD from the fourth stage (the most significant bit in the counter 111) cell is applied, after inverted, to the AND gate 121A. As described previously, the logic processing circuit 121 is supplied with the output from the corresponding digit latch circuit 233 of the latch circuit 230. The output RA from the least significant bit of the corresponding digit latch circuit 233 is applied to the AND gate 121A, the output RB is applied to the AND gate 121B, the output RC is applied to the AND gate 121C, and the output RD is applied to the AND gate 121D, respectively.

Now, assuming that the outputs RA and RC are "1," the AND gates 121B and 121D are off, so that the outputs OA and OC of the AND gates 121A and 121C are as shown in (7) and (8) in FIG. 3A. The outputs OA and OC are OR processed by the OR gate 121E. The output from the OR gate 121E is withdrawn as an output from the logical processing circuit 121 as at $f_{out}$ as shown in (9) of FIG. 3A. As seen from the output $f_{out}$, it is understood that the input pulse $f_{in}$ has been modified or modulated in the number thereof such that the pulse number of the input pulse $f_{in}$ is decreased on the basis of the four-bit parallel coded decimal signals RA, RB, RC and RD, which are associated with the weight of the material. In other words, the input pulse $f_{in}$ is multiplied by the rate smaller than unity in accordance with the bit parallel coded digital signals RA, RB, RC and RD. In the foregoing, the operation only in the least significant digit portion was described. However, substantially the same operation of logical processing is effected in the remaining digit logical processing circuits 122 and 123. The outputs from these logical processing circuits 121, 122 and 123 are applied to the OR gate 124 to provide an output from the pulse number modifying means 100.

Figure 2B:
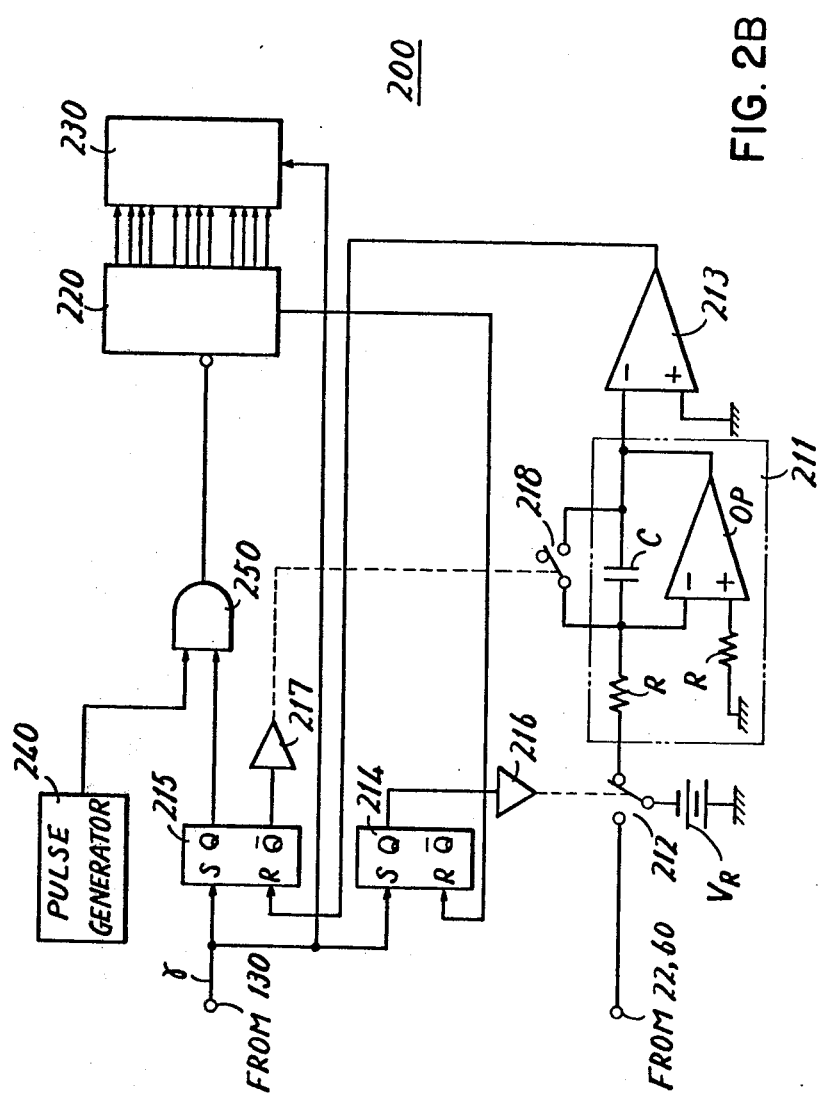
FIG. 2B is a block diagram showing in more detail the circuit configuration of the A/D converting means 100.
Figure 3A:
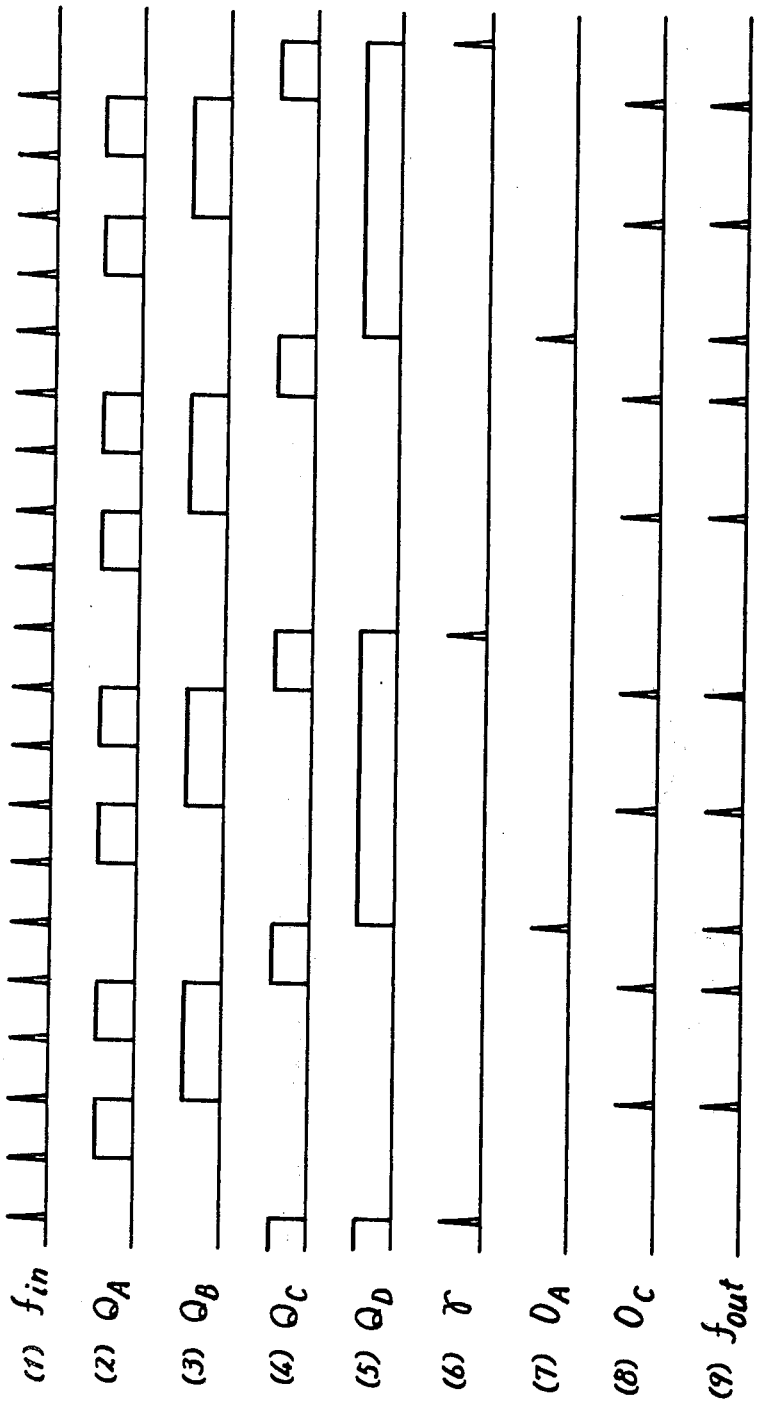
FIG. 3A shows waveforms of the signals at various portions in the FIG. 2A circuit, and will be referred to in the following description of the FIG. 2A circuit.

FIG. 2B is a block diagram showing in more detail the circuit configuration of the A/D converting means 200. The pulse output γ from the full scale detector 130 is applied to the RS flip-flops 214 and 215 to set them, and is also applied to the decimal counter 220 to reset it in an initial condition. The set output from the RS flip-flop 214 energizes a switch driver 216, which in turn actuates an input switch 212 to turn it to the analog input terminal side. Upon switching over of the input switch 212 as mentioned above, the analog input voltage from the amplifier 60 is applied to an integrating circuit 211. The integrating circuit 211 comprises an operational amplifier OP, one input of which is connected through a register R to the input switch 212 and another input of which is grounded through a register R, the output and the said one input of the operational amplifier OP being shunted by a capacitor C. The integrating circuit 211 functions to integrate the applied analog input voltage. More specifically, when the input switch 212 is switched to the analog input, as mentioned above, the capacitor C is charged, and accordingly the operational amplifier OP provides a ramp voltage of the negative gradient. On the other hand, the set output from the RS flip-flop 215 enables the AND gate 250. As a result, a portion of the train of clock pulses of a fixed frequency obtainable from the pulse generator 240 is allowed to pass through the AND gate 250 and is applied to the decimal counter 220. If and when the decimal counter 220 makes count of 1000 input pulses, a count up output is obtained therefrom. Since the input clock pulses are of fixed frequency, the time period required for the decimal counter 220 to count 1000 pulses is normally constant. The count up output from the counter 220 reset the RS flip-flop 214. Accordingly, the switch driver 216 is deenergized and the input switch 212 is switched to a negative reference voltage VR. In other words, the analog input voltage is allowed to be applied to the integrating circuit 211 only during a time period required for the counter 220 to count 1000 clock pulses and integration is made of the value associated with the analog value. After the input switch 212 is switched to the negative reference, the integrating circuit 211 is supplied with the said negative reference voltage. Therefore, the operational amplifier OP generates this time a ramp voltage of a predetermined positive gradient. When the said ramp voltage of the positive predetermined gradient becomes zero, another amplifier in the subsequent stage constituting zero detector 213 detects the ramp voltage reaching zero. The detected output from the detector 213 resets the RS flip-flop 215. Accordingly, the reset output therefrom energizes a switch driver 217, so that a normally open type integrated switch 218 is closed, which shunts the capacitor C of the integrating circuit 211, with the result that the integrating circuit 211 is short-circuited and will return to the initial condition. Since the reference voltage VR is constant and thus the positive gradient of the ramp voltage is also constant, the time period after the decimal counter 220 provides the count up output and at the same time the input switch 212 is switched to the reference voltage VR until the zero detector 213 detects the ramp voltage reaching zero, proves to be proportional to the magnitude of the analog voltage as received immediately before the said time period. Only during the time period proportional to the magnitude of the input analog voltage, the clock pulses obtainable from the pulse generator 240 are counted by the decimal counter 220.

Figure 3B:
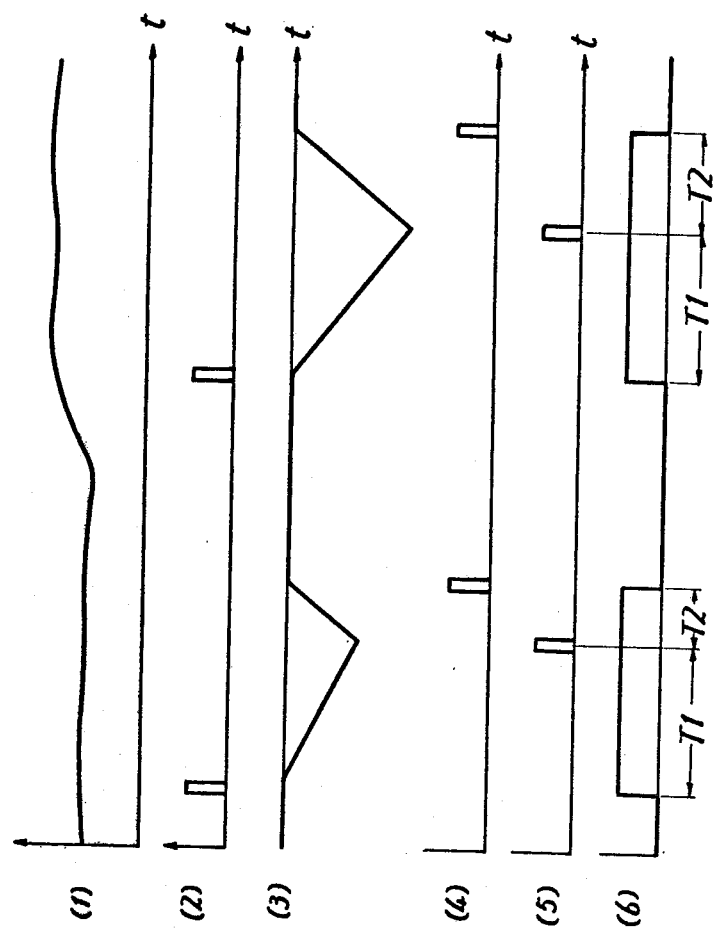
FIG. 3B shows waveforms for explanation of the operation of the FIG. 2B circuit.

FIG. 3B shows waveforms for explanation of the operation of the FIG. 2B circuit. The waveform (1) in FIG. 3B is an example of the analog voltage. When the output γ (see (2) in FIG. 3B) is obtained from the full scale detector 130, the decimal counter 220 is returned to the initial condition and the RS flip-flops 214 and 215 are set. In response to the set output from the RS flip-flop 214, the input analog voltage is integrated by the integrating circuit 211. On the other hand, the AND gate 250 is enabled by the set output (see (6) in FIG. 3B) of the flip-flop 215, so that the clock pulses from the pulse generator 240 are counted by the decimal counter 220. The decimal counter 220 counts 1000 clock pulses during a predetermined time period T1 (see (6) in FIG. 3B) and provides a count up output (see (5) in FIG. 3B) when just 1000 pulses are counted. The count up output switches the input switch 212, so that the voltage to be integrated is changed from the input analog voltage to the reference voltage. With particular reference to the waveform (3) in FIG. 3B, the integrating circuit 211 provides a ramp voltage of the negative gradient which is proportional to the magnitude of the input analog voltage during the predetermined time period T1, and in response to the count up output (see (5) in FIG. 3B) the ramp voltage is changed from the negative gradient to the positive gradient which is of a predetermined constant value associated with the constant reference voltage. The output from the integrating circuit 211 changes from the negative value toward zero, and when the zero is reached, the zero detector 213 provides a zero detected output (see (4) in FIG. 3B), thereby to reset the integrating circuit 211. The zero detected output (see (4) in FIG. 3B) resets the RS flip-flop 215, so that the set output therefrom becomes the low level (see (6) in FIG. 3B). In other words, the time period the RS flip-flop 215 is kept in the set condition after the said predetermined time period T1 is commensurate with the time period after the count up output (see (5) in FIG. 3B) is obtained until the zero detected output (see (4) in FIG. 3B) is obtained. It is understood that the length of the time period T2 is proportional to the magnitude of the input analog voltage applied during the said predetermined time period T1. The number of clock pulses obtainable from the pulse generator 240 during the said time period T2 is counted by the decimal counter 220, starting from "0." The larger the magnitude of the input analog voltage, the longer the time period T2 and the larger the number of pulses as counted. The count output of the counter 220 is withdrawn in a bit parallel fashion. Thus it is understood that the input analog voltage is converted into a bit parallel coded digital signal.

Figure 4:
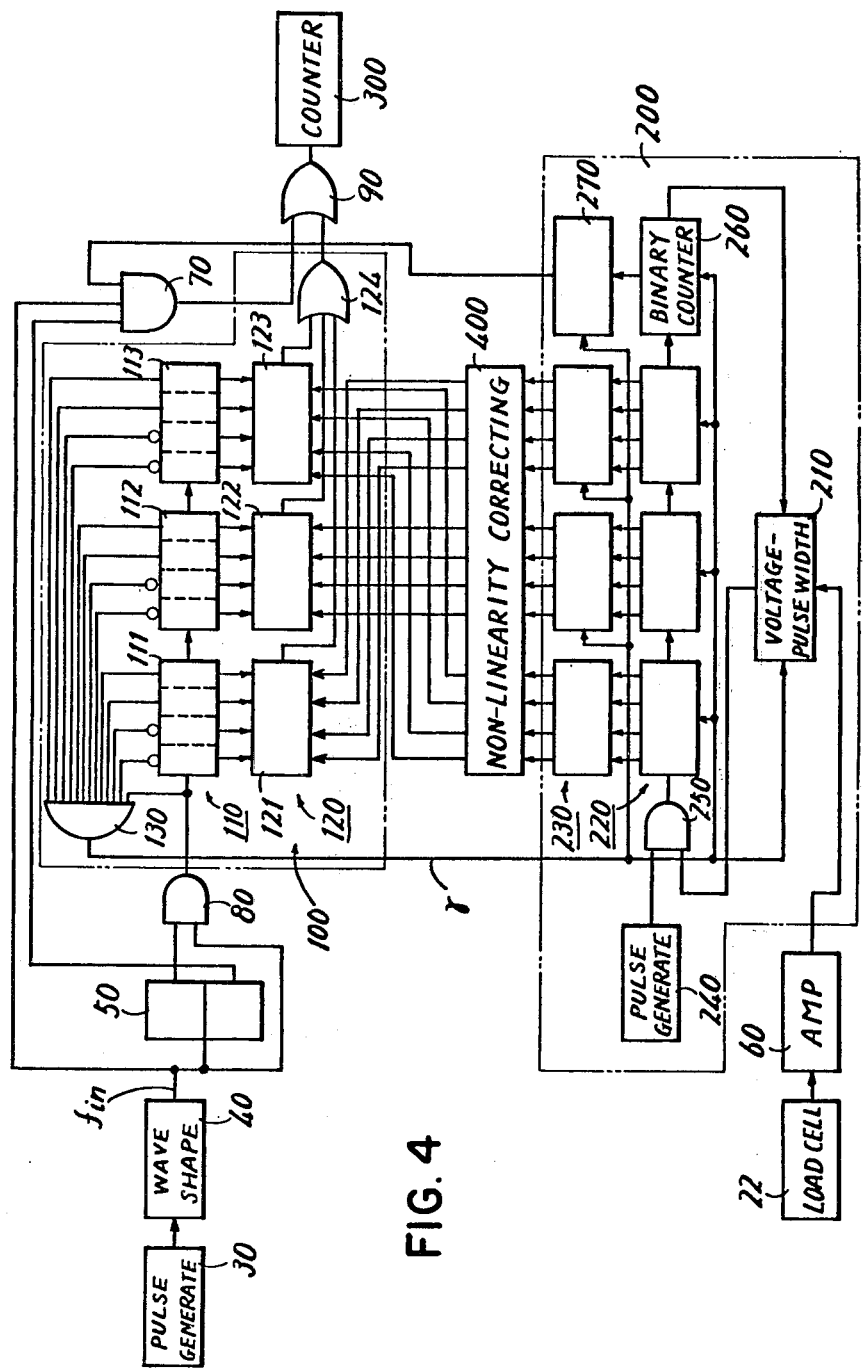
FIG. 4 shows a block diagram of the circuit configuration of another embodiment of the present invention.

FIG. 4 shows a block diagram of the circuit configuration of another embodiment of the present invention. In order to increase the accuracy of measurement, the number of digits of the decimal counter 110 in the pulse number modifying means 100 should be also increased, thereby to increase the resolution of measurement. However, if the number of digits of the counter 110 is increased, the number of pulses ("1000" in the FIG. 2 embodiment) required for one cycle of the pulse number modifying means 100 increases by geometrical progression, with the result that the time period necessary for one cycle operation of the pulse number modifying means 100 becomes too long and this degrades the precision of measurement. For example, in the FIG. 2 embodiment, an increase of one digit in the decimal counter 100 results in an increase of ten times the one cycle operation time. In some applications of the apparatus, such an additional provision of one digit of four bits is redundant and therefore an additional provision of one digit counter of less number of bits is preferred for the purpose of simplicity of increasing the accuracy with the least possible additional provision. Accordingly, the FIG. 4 embodiment makes skillful use of a combination of the decimal counter 110 in FIG. 2 with an additional binary counter, whereby an increase in one cycle operation time required for increasing the resolution is minimized, while the accuracy of the cumulative count is increased.

With reference to FIG. 4 together with FIG. 2, the structure of the three digit portions in the pulse number modifying means 100 and the A/D converting means 200 is substantially the same as that in the FIG. 2 embodiment and therefore the description thereof is omitted. The first feature of the FIG. 4 embodiment is an additional provision of a flip-flop 50 and an AND gate 80 interposed between the wave shaping circuit 40 and the pulse number modifying means 100. The pulse signal $f_{in}$ as wave shaped by the wave shaping circuit 40 is applied to the flip-flop 50, so that the flip-flop 50 is set or reset repeatedly for each input pulse as received. The set output from the flip-flop 50 is applied to one input to the AND gate 80. The said wave shaped pulse is applied to the other input to the AND gate 80. The output from the AND gate 80 is applied to the decimal counter 110. Therefore, the pulse $f_{in}$ from the wave shaping circuit 40 is frequency divided by 2 or to a half by means of the flip-flop 50 and the AND gate 80 and is applied to the decimal counter 100. The pulse thus frequency divided to a half is also applied to one input to the full scale detector (AND gate)130. Since the decimal counter 110 counts 1000 pulses thus frequency divided to a half, the full scale detector 130 provides an output $\gamma$ at every 2000 original, wave shaped pulses $f_{in}$ obtainable from the wave shaping circuit 40.

The second feature of the FIG. 4 embodiment is a provision of an AND gate 70, which receives the reset output from the flip-flop 50 as one input thereto. The AND gate 70 constitutes, together with the said flip-flop 50, the above described binary counter implementation. To that end, the wave shaped pulse $f_{in}$ is also applied to the AND gate 70 by way of a strobe signal. In addition, an output from an additional latch circuit 270 of one bit configuration to be described subsequently is also applied to a further input to the AND gate 70. Assuming that an output is obtained from the latch circuit 270 to enable the AND gate 70, 1000 pulses are allowed to pass therethrough based on the reset output from the flip-flop 50 strobed with the wave shaped output. The said 1000 pulses passing through the AND gate 70 is applied through an OR gate 90, without being conditioned, and is cumulatively counted by the counter 300. Since the pulses passing through the AND gate 70 and the pulses obtainable from the OR gate 124 are out of phase, there is no conflict between both at the OR gate 90.

The third feature of the FIG. 4 embodiment is an additional provision of a binary counter 260 and a binary latch circuit 270 corresponding to the binary counter 260 in the digit position of the 1000 in the decimal counter 220 in the A/D converting means 200, such that the said additional provision may correspond to the previously described AND gate 70 combined with the flip-flop 50 for implementing the binary counter function. As a result, the combination of the decimal counter 220 and the binary counter 260 enables counting of 2000 clock pulses at the maximum, such as from "0" to "1999." In case where the weight of the material on the belt conveyer is relatively light, the analog voltage is also relatively low, so that no more than 1000 clock pulses are counted by the said composite counter 230 and 270. On the contrary, if and when the weight of the material on the belt conveyer is relatively weighty, the analog voltage is also relatively high, and accordingly, more than 1000 clock pulses are counted. If and when more than 1000 clock pulses are counted, the bit output of the binary counter 260 becomes "1," which is transferred to the latch circuit 270 and is latched therein. The latch output enables the AND gate 70, as described previously.

The fourth feature of the FIG. 4 embodiment is an additional provision of a non-linearity correcting circuit 400 for correcting non-linear error occurring in the conveyer belt between the latch circuit 230 and the conditioning circuit 120.

Figure 5A:
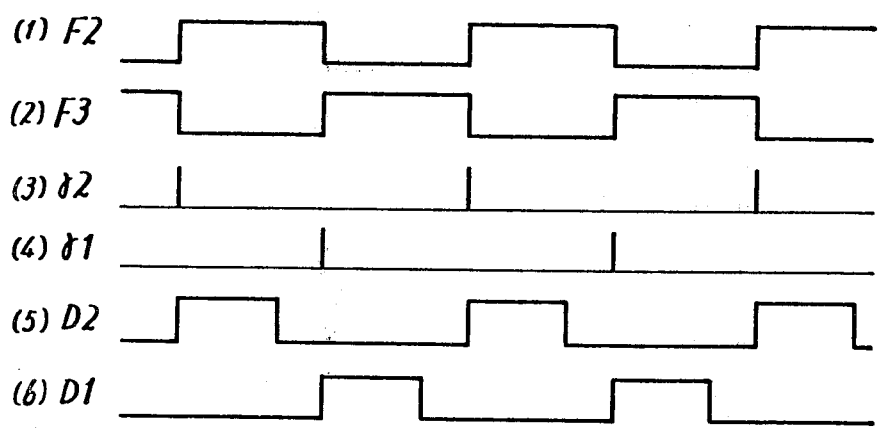
FIG. 5A shows waveforms of the signals at various portions in the FIG. 5 circuit.
Figure 5:
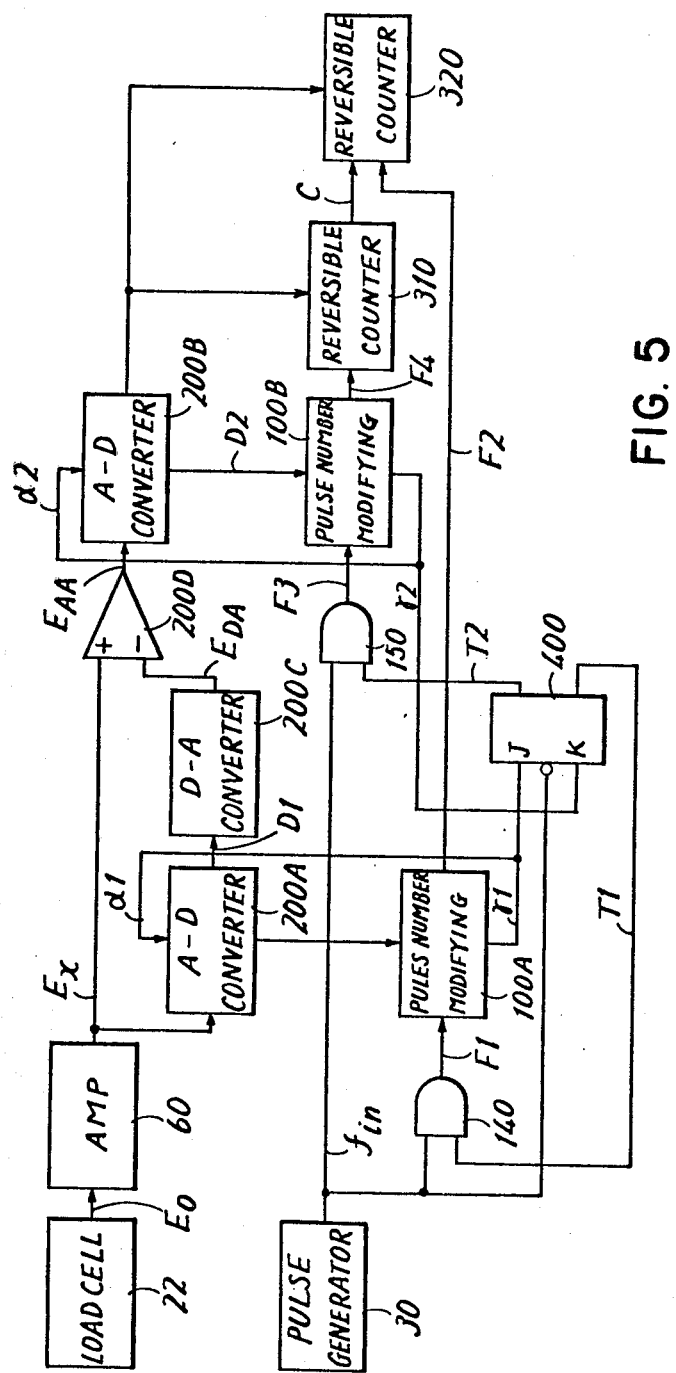
FIG. 5 is a block diagram of a further embodiment of the present invention.

FIG. 5 is a block diagram of a further embodiment of the present invention. A noteworthy feature of the FIG. 5 embodiment is that the A/D converting means for converting an analog signal associated with the measured weight into a digital signal comprises a rough A/D converter and a fine A/D converter. The analog signal Ex obtained by the load cell 22 and amplified by the amplifier 60 is first converted, in a rough manner, into the digital signal D1, by means of an A/D converter 200A. The digital signal D1 thus converted is applied to an D/A converter 200C in the subsequent stage wherein the digital signal D1 is again converted to an analog voltage EDA. The analog voltage EDA and the said original analog signal Ex are both applied to an analog adder 200D in the subsequent stage. The analog adder 200D functions to evaluate the difference between the said original analog voltage Ex and the said regained voltage EDA to provide a difference voltage EAA. The difference voltage EAA is applied to a second A/D converter 200B and is converted, in a fine manner, into a digital signal D2. By way of an example, assuming that the A/D converting means in the FIG. 5 embodiment is capable of converting the analog signal from the load cell into the digital signal of the numeral value range of 0000 to 9999, i.e. is of the resolution of the $10^4$, the A/D converter 200A functions to convert the weight analog signal into a digital value of one tenth resolution, and then the A/D converter 200B functions to convert the resultant analog signal into a digital signal of one thousandth resolution, and these digital signals are combined in a tandem fashion to provide a required digital signal of ten thousandth resolution. In other words, the first A/D converter 200A combined with the digital-to-analog (D/A) converter 200C serves to make A/D conversion of the digit of 1000, while the second A/D converter 200B serves to make A/D conversion of the digits of 100, 10 and 1, whereby a four-digit A/D converter is implemented.

As described previously, the A/D converter 200A makes A/D conversion of the input weight analog voltage Ex with one tenth resolution, which is again converted to an analog signal which is representative of the minimum level of the digital signal with one tenth resolution. It is important that the difference between the adjacent levels of the output obtainable from the D/A converter 200C is commensurate with one tenth of the full scale output from the amplifier 60. Accordingly, the A/D converter 200B is adapted to be capable of converting the analog signal varying by one tenth of the full scale output from the amplifier 60 into a digital signal of one thousandth resolution. It is understood that the output from the amplifier 60 can vary within the range of the said full scale, while the output from the D/A converter 200C provides the corresponding minimum level digital signal of the varying output from the amplifier in accordance therewith. Therefore, the said level output from the converter 200C is applied to a minus input terminal of the analog adder 200D, while the said varying output Ex from the amplifier 60 is applied to a plus terminal of the analog adder 200D, whereby the difference voltage EAA between the said voltages Ex and EDA is evaluated. The difference voltage EAA is then applied to the A/D converter 200B and is converted into a digital signal having three digit value of 000 to 999 in a fine manner.

The output D1 and D2 of the A/D converter 200A and 200B, respectively, are applied to the pulse number modifying means 100A and 100B, respectively. The pulse number modifying means 100A is supplied with the pulse F1 which is generated by the pulse generator 30 in association with the speed of the belt conveyer and is allowed to pass through the AND gate 140 only during the gate 140 is enabled by a timing pulse T1 to be described subsequently. On the other hand, the pulse number modifying means 100A receives the output from the A/D converter 200A. Therefore, the pulse number modifying means 100A provides an output pulse F2 which is equivalent to 1000 original pulses obtainable from the pulse generator 30. The reason is that the timing pulse T1 is withdrawn from the output $\bar{Q}$ of the JK flip-flop 400 the K terminal of which is supplied with the full scale detected signal γ2 which is obtainable when 1000 pulses from the generator 30 is counted by the pulse number modifying means 100A. On the other hand, the pulse number modifying means 100B is supplied with a train of pulses from the pulse generator 30 through the AND gate 150. The AND gate 150 is enabled by a timing signal T2 which is withdrawn from the output Q of the said JK flip-flop 400 upon receipt, by the J terminal thereof, of the full scale detected signal γ1 (obtainable at the count up of every ten pulses) obtainable from the pulse number modifying means 100A. The said pulse F2 which has been weighed of 1000 pulses is applied to a reversible counter 320 constituting the most significant digit of the counter 300, while the pulse F4 which has been weighed of each one pulse is a reversible counter 310 constituting the less significant digits of the counter 300, both counters 320 and 310 together constituting the counter 300, as to be more fully described.

Since the A/D conversion requires a slight time and the A/D converters 200A and 200B operates alternately, the said pulse number modifying means 100A and 100B also operate alternately. Such operation is shown in FIG. 5A.

In general, the A/D conversion takes much more time than the pulse number modifying means operates. Therefore, the full scale detected signals γ1 and γ2 obtainable from the pulse number modifying means 100A and 100B, respectively, are used as operation start signals γ1 and γ2 for the A/D converters 200A and 200B, respectively. The output pulses F2 and F4 alternately obtained from the pulse number modifying means 100A and 100B, respectively, are applied to the reversible counters 320 and 310, respectively, which together constitute the counter 300 of four digits, which makes count of the output pulses F2 and F4. The reversible counter 320 is also connected to receive a carry signal C from the reversible counter 310. Thus, the reversible counter 320 makes count of the most significant digit, while the reversible counter 310 makes count of the less significant digits. Even in case of no material placed on the conveyer belt, the load cell 22 can provide a small positive or negative output due to vibration of the conveyer belt, which causes an undesired analog output. In order to evade the inconvenience thus caused, a switch signal P1 for enabling the positive going count is applied to the respective reversible counters 310 and 320 from the A/D converter 200B, only if the output voltage Ex from the load cell 22 is positive, and a switch signal P1 for enabling the negative going count is applied to the respective reversible counters 310 and 320 from the A/D converter 200B only if the output voltage Ex from the load cell 22 is negative.

According to the FIG. 5 embodiment, the output voltage Ex of an instantaneous weight value detected by the load cell 22 is converted, in a rough manner, into a digital signal D1, which is D/A converted into the level signal EDA, and then the difference between the original output voltage Ex and the level signal EDA is evaluated, and is again A/D converted, in a fine manner, by the second A/D converter 200B, while the bit parallel coded digital outputs from the respective A/D converters 200A and 200B are fed to the corresponding pulse number modifying means 100A and 100B, respectively, whereby the pulse output obtained from the pulse generator 30 in association with the speed of the conveyer belt is multiplied by the rate (smaller than unity) determined by the said coded digital output, and the outputs from the pulse number modifying means 100A and 100B are separately counted by the more significant digit reversible counter and the less significant digit reversible counter, respectively, which together constitute a single reversible counter having the more and less significant digits. As a result, an apparatus for cumulatively measuring the weight of a continuous bulk material with high precision can be provided using a common A/D converter, and without necessity of a high resolution and a high precision A/D converter and an increased number of digits of pulse number modifying means.

Figure 6:
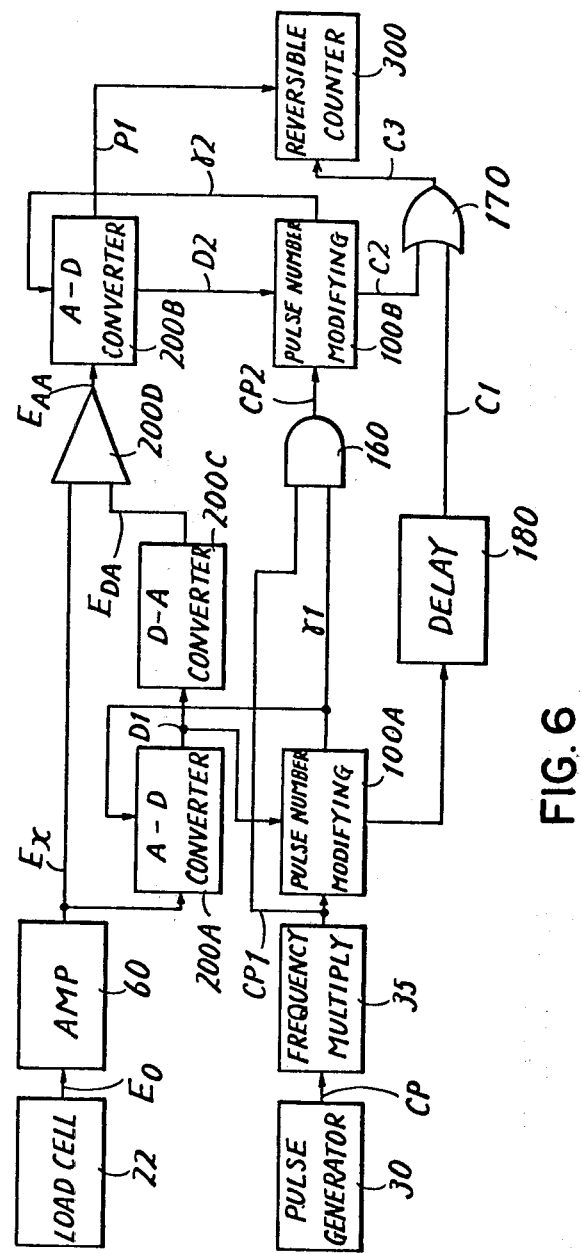
FIG. 6 is a block diagram of a still further embodiment, which is similar to the FIG. 5 embodiment.

FIG. 6 is a block diagram of a still further embodiment, which is similar to the FIG. 5 embodiment. In comparison with the FIG. 5 embodiment, the different feature of the FIG. 6 embodiment is that the first pulse number modifying means 100A is adapted to provide a corresponding number of thousands of pulses, without any weight in each pulse, whereas in the FIG. 5 embodiment one pulse output from the means 100A has a weight of 1000 pulses in terms of the pulse output from the pulse generator 30. According to the FIG. 6 embodiment, the pulse output CP from the pulse generator 30 is frequency multiplied, by say 10, to provide a pulse CP1 of 10 times the original frequency. Thus, there is a relation CP1 = 10CP. The pulse CP1 is applied to the pulse number modifying means 100C and is also applied to the AND gate 160. As described with reference to FIG. 5, the pulse number modifying means 100A provides a full scale detected signal γ1 at the count of 10 pulses CP1. Thus, there is a relation γ1 = (1/10) CP1. The signal γ1 is applied to the AND gate 160. Therefore, the output CP2 from the AND gate 160 becomes the same as the pulse CP. The pulse CP2 is applied to the second pulse number modifying means 100B. Again in comparison of the FIG. 6 embodiment with the FIG. 5 embodiment, instead of AND processing the pulse CP by the signal T1 for the purpose of the affording the weight of the most significant digit in the FIG. 5 embodiment, the FIG. 6 embodiment is structured such that the pulse CP is frequency multiplied by a frequency multiplying circuit 35 by 10 and is applied to the first pulse number modifying means 100A. Therefore, the output C1 from the pulse number modifying means 100A becomes 1000D1 where D1 is a digital value obtainable from the A/D converter 200A (C1 = 1000D1), and the output C2 from the pulse number modifying means 100B becomes D2, where D2 is a digital value obtainable from the A/D converter 200B (C2 = D2). The outputs C1 and C2 from the pulse number modifying means 100A and 100B, respectively, are OR processed by an OR gate 170 and the output therefrom is applied to the reversible counter 300. It is pointed out that a delay circuit 180 is interposed between the pulse number modifying means 100A and the OR gate 170 in order to delay the output C1, thereby to evade any conflict between the outputs C1 and C2. Therefore, the output C3 from the OR gate 170 becomes (1000D1 + D2), and the output C3 is applied to the reversible counter 300.

According to the present invention, a train of pulses generated in association with the speed of a conveyer belt is modified or modulated as a function of the weight of a continuous bulk material transported by the conveyer belt such that some pulses are removed substantially homogeneously whereupon the pulses thus modified are counted. Thus, it is seen that the present invention can be advantageously employed in a constant supplying apparatus, such as a poidmeter, wherein the control is made such that the product of the speed of a conveyer belt and the weight as measured of a continuous bulk material transported by the conveyer belt may be constant. According to the inventive apparatus, digital operation is carried out for the purpose of evaluating the product of the speed of conveyer belt and the weight of a material transported by the conveyer belt, so that an operational error can be avoided and stability of the operation of the apparatus is attained against environmental fluctuation. Since immunity from environmental influence of the inventive apparatus is superior, the inventive apparatus can be advantageously used for measurement of the weight of a continuous bulk material, such as coal, limestone, cement and the like. In addition, with the inventive apparatus, it is readily possible to increase the measurement precision.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. An apparatus for measuring the weight of a material conveyed by a conveying apparatus over a finite interval, comprising:

means for conveying a continuous bulk material;

pulse generator means operatively coupled to said conveying means for generating pulses of the frequency associated with the conveying speed of said conveying means;

analog signal means operatively coupled to said conveying means for generating an analog signal associated with the weight of said material conveyed by said conveying means;

analog/digital convertor means responsive to said analog signal from said analog signal generating means for converting said analog signal into a bit parallel coded digital signal representative of said analog signal;

counter means responsive to said speed associated frequency pulses from said pulse generating means for counting the number of said speed associated pulses for providing bit parallel count output pulses therefrom;

number signal generating means responsive to said speed associated frequency pulses from said pulse generating means and to said counter means for generating a signal representative of a predetermined number of said speed associated frequency pulses;

said analog-to-digital converter means being responsive to said number signal generating means through latch means for outputting said bit parallel coded digital signal therefrom;

logic means interconnected with said counter means and said analog-to-digital converter means, responsive to said bit parallel count output pulses from said counter means, and said bit parallel coded digital signal from said analog-to-digital converter means for reducing the number of bit parallel count output pulses within the time period for said predetermined number of speed associated pulses, as a function of said bit parallel coded digital signal; and means for withdrawing an output from said logic means, representative of the weight of material conveyed over said finite interval.

2. A measuring apparatus in accordance with claim 1, which further comprises means interposed between said analog-to-digital converting means and said pulse number reducing means for compensating a non-linear error included in said analog signal caused by said conveying means.

3. The invention defined in claim 1, wherein said logic means comprises:

more significant digit logic means for reducing the number of speed associated frequency pulses within the time period of said predetermined number of pulses with respect to the more significant digit; and less significant digit logic means for reducing the number of speed associated frequency pulses within the time period of said predetermined number of pulses with respect to the less significant digits;

the value in said more significant digit logic means being adapted to assume a binary value of one or zero;

said more significant digit logic means comprising:

means for frequency dividing by two the pulses from said pulse generating means; and gate means responsive to an output from said frequency dividing means and an output from the more significant digit output from said analog-to-digital convertor means for allowing said output from said frequency dividing means to pass therethrough as a function of said output from said more significant digit output from said analog-to-digital convertor means;

said output withdrawing means comprising means for providing a logical sum of an output from said more significant logic means and an output from said less significant logic means.

4. A measuring apparatus in accordance with claim 3, which further comprises means interposed between said analog-to-digital converting means and said pulse number reducing means for compensating a non-linear error included in said analog signal caused by said conveying means.

5. A measuring apparatus in accordance with claim 1, wherein said analog-to-digital converting means comprises means for judging a direction of change in said analog signal.

6. A measuring apparatus in accordance with claim 5, wherein said output withdrawing means comprises a reversible counter responsive to said change direction judging means for controlling the direction of operation thereof.

7. The invention defined in claim 1, wherein said logic means comprises:

more significant digit logic means for reducing the number of speed associated frequency pulses within the time period of said predetermined number of pulses with respect to the more significant digit; and less significant digit logic means for reducing the number of speed associated frequency pulses within the time period of said predetermined number of pulses with respect to the less significant digits;

said output withdrawing means comprises a counter comprising a more significant digit counter and a less significant digit counter;

the output from said more significant digit logic means being applied to said more significant digit counter, and the output from said less significant digit logic means being applied to said less significant digit counter; and said analog-to-digital convertor means comprises:

means for converting, in a rough manner, said analog signal into a digital signal; and means for converting, in a fine manner, said analog signal into a digital signal;

the output from said rough analog-to-digital converting means being applied to said more significant digit logic means; and the output from said fine analog-to-digital converting means being applied to said less significant digit logic means.

8. A measuring apparatus in accordance with claim 7, which further comprises:

digital-to-analog conversion means driven by the output of said means for converting said analog signal to a digital signal in a rough manner and providing an analog output representative of said output; and difference means driven by said analog output and the said analog signal associated with the weight of conveyed material from said analog signal means to provide a difference output between said analog signals;

said difference output comprising the input to the said means for converting said analog signal into a digital signal in a fine manner.

9. A measuring apparatus in accordance with claim 8, wherein said analog-to-digital converting means further comprises means for judging a direction of change in said analog signal.

10. A measuring apparatus in accordance with claim 9, wherein said output withdrawing means comprises a reversible counter responsive to said change direction judging means for controlling the direction of operation thereof.

11. A measuring apparatus in accordance with claim 8, wherein the output from said more significant digit logic means is adapted to have the weight of said digit.

12. A measuring apparatus in accordance with claim 7, wherein said analog-to-digital converting means further comprises means for judging a direction of change in said analog signal.

13. A measuring apparatus in accordance with claim 12, wherein said output withdrawing means comprises a reversible counter responsive to said change direction judging means for controlling the direction of operation thereof.

14. A measuring apparatus in accordance with claim 7, wherein the output from said more significant digit logic means is adapted to have the weight of said digit.

15. A measuring apparatus in accordance with claim 1, which further comprises means for frequency multiplying the speed associated frequency pulses from said pulse generating means.

16. The invention defined in claim 1, wherein said logic means comprises:
- more significant digit logic means for reducing the number of speed associated frequency pulses within the time period of said predetermined number of pulses with respect to the more significant digit; and
- less significant digit logic means for reducing the number of speed associated frequency pulses within the time period of said predetermined number of pulses with respect to the less significant digits;

said analog-to-digit convertor means comprises:
- means for converting, in a rough manner, said analog signal into a digital signal; and
- means for converting, in a fine manner, said analog signal into a digital signal;
- the output from said rough analog-to-digital converting means being applied to said more significant digit logic means; and
- the output from said fine analog-to-digital converting means being applied to said less significant digit logic means; and said output withdrawing means comprising means for providing a logical sum of an output from said more significant logic means and an output from said less significant logic means.

17. A measuring apparatus in accordance with claim 16, which further comprises means for frequency multiplying the speed associated frequency pulses from said pulse generating means.

18. A measuring apparatus in accordance with claim 16, wherein said analog-to-digital converting means further comprises means for judging a direction of change in said analog signal.

19. A measuring apparatus in accordance with claim 18, wherein said output withdrawing means comprises a reversible counter responsive to said change direction judging means for controlling the direction of operation thereof.

20. A measuring apparatus in accordance with claim 16, wherein the output from said more significant digit logic means is adapted to have no weight of said digit.

* * * * *

UNITED STATES PATENT AND TRADEMARK OFFICE
CERTIFICATE OF CORRECTION

PATENT NO. : 4,134,465
DATED : January 16, 1979
INVENTOR(S) : Hisataka TAKAHAMA and Hitoshi KIMURA It is certified that error appears in the above-identified patent and that said Letters Patent are hereby corrected as shown below:

IN THE HEADING OF THE PATENT:

Under Foreign Application Priority Data, add the following:

--Dec. 3, 1975    Japan ............ 50-145365
  Dec. 4, 1975    Japan ............ 50-146530

Signed and Sealed this

Third Day of July 1979

[SEAL]

Attest:

LUTRELLE F. PARKER

Attesting Officer    Acting Commissioner of Patents and Trademarks